(12) United States Patent
Kwon et al.

(10) Patent No.: US 8,134,677 B2
(45) Date of Patent: Mar. 13, 2012

(54) LIQUID CRYSTAL DISPLAY PANEL AND METHOD OF FABRICATING THE SAME

(75) Inventors: Jao-Chang Kwon, Gyeongsangbuk-Do (KR); Yu-Ri Shim, Gyeongsangbuk-Do (KR); Chang-Yeop Shin, Gyeonggi-Do (KR); Chung-Wan Oh, Gyeongggi-Do (KR); Dong-Bok Kim, Jeollanam-Do (KR)

(73) Assignee: LG. Display Co. Ltd., Seoul (KR)

( * ) Notice: Subject to any disclaimer, the term of this patent is extended or adjusted under 35 U.S.C. 154(b) by 210 days.

(21) Appl. No.: 12/345,353

(22) Filed: Dec. 29, 2008

(65) Prior Publication Data

US 2009/0323001 A1 Dec. 31, 2009

(30) Foreign Application Priority Data

Jun. 25, 2008 (KR) .......................... 10-2008-0060424

(51) Int. Cl.
*G02F 1/1339* (2006.01)
(52) U.S. Cl. ......... 349/151; 349/149; 349/153; 349/190
(58) Field of Classification Search .................. None
See application file for complete search history.

(56) References Cited

U.S. PATENT DOCUMENTS

| 6,888,606 B2 * | 5/2005 | Hinata et al. ................. 349/149 |
| 7,436,480 B2 * | 10/2008 | Kang et al. .................... 349/149 |
| 2004/0135941 A1 * | 7/2004 | Nam et al. .................... 349/110 |

FOREIGN PATENT DOCUMENTS

CN 1523427 A 8/2004

OTHER PUBLICATIONS

Office Action issued in corresponding Chinese Patent Application No. 200810189425.6, mailed Nov. 29, 2010.

* cited by examiner

*Primary Examiner* — Thanh-Nhan Nguyen
(74) *Attorney, Agent, or Firm* — Brinks Hofer Gilson & Lione

(57) ABSTRACT

Provided are a liquid crystal display panel and a method of fabricating the same, which can increase the attachment force of the liquid crystal display panel by forming holes in wires passing through a seal line in a case where a liquid crystal layer is formed by a dropping method, reduce the resistance of the wires by differentiating the width of the holes from the width of the wires with respect to a specific region of the seal line, and prevent an afterimage defect caused by blurring and contamination of the seal line.

The liquid crystal display panel comprises: an array substrate having a pixel part and a color filter substrate; a seal line formed along an outer edge of the pixel part to attach the array substrate and the color filter substrate together; a plurality of signal wires for transmitting signals to the pixel part; and holes formed within the signal wires passing through the seal line and filled with a sealant comprising the seal line, wherein the holes are designed to have a different width at an inner side and an outer side of the liquid crystal display panel with respect to a predetermined region of the seal line.

6 Claims, 6 Drawing Sheets

FIG. 10

|  | SIMULATION RESISTANCE | HOLE APERTVRE RATIO |
|---|---|---|
| 1st EMBODY MENT | 2.98kΩ | 46% |
| 2nd EMBODY MENT | 1.9kΩ | 62% |
| IMPROVEMENT RATIO | 36.2% | 34.8% |

LIQUID CRYSTAL DISPLAY PANEL AND METHOD OF FABRICATING THE SAME

RELATED APPLICATION

The present disclosure relates to subject matter contained in priority Korean Application No. 10-2008-0060424, filed on Jun. 25, 2008, which is herein expressly incorporated by reference in its entirety. federally sponsored research or development

BACKGROUND

1. Field of the Disclosure

The present invention relates to a liquid crystal display panel and a method of fabricating the same, and particularly, to a liquid crystal display panel, which has a liquid crystal layer formed by a dropping method, and a method of fabricating the same.

2. Description of the Related Art

In general, the LCD device is a display device in which data signals corresponding to image information is supplied to a matrix of pixels. The data signals control optical transmittance of the pixels so as to display images.

The LCD device includes a liquid crystal display panel in which the pixels are arranged in a matrix and a driving part for driving the pixels.

The liquid crystal display panel includes an array substrate on which a thin film transistor (TFT) array is formed and a color filter substrate on which color filters are formed. The TFT array substrate and the color filter array substrate are attached to each other with a uniform cell gap maintained therebetween with a liquid crystal layer positioned within the cell gap.

Alignment films are formed on surfaces of the array substrate and the color filter substrate that face each other. The alignment films are rubbed to make liquid crystals to be arranged in a predetermined direction.

The array substrate and the color filter substrate are attached by a seal line formed along an outer edge of a pixel part. A polarization film and a retardation film are provided on each outer surface of the TFT array substrate and the color filter substrate. By selectively constructing a plurality of components, a liquid crystal display panel can have high luminance and good contrast characteristics by changing the direction and/or refracting the proceeding light.

Hereinafter, the liquid crystal display panel constructed as above will be described in detail with reference to the drawings.

FIG. 1 is an illustrative view schematically showing a structure of a crystal display panel according to the related art.

As shown in FIG. 1, the liquid crystal display panel includes a pixel part 35 having pixels arranged in a matrix for displaying an image, a gate pad part 31 electrically connected with the gate lines 16 of the pixel part 35, and a data pad part 32 electrically connected with the data lines 17 of the pixel part 35.

The gate pad part 31 and the data pad part 32 are formed at an edge portion of the array substrate 10, which is not overlapped by a color filter substrate 5. The gate pad part 31 supplies a scan signal from the gate driving unit (not shown) to the gate lines 16 of the pixel part 35, and the data pad part 32 supplies image information from the data driving unit (not shown) to the data lines 17 of the pixel part 35.

The data lines 17 to which image information is applied and the gate lines 16 to which a scan signal is applied are arranged to cross each other on the array substrate 10. A thin film transistor (not shown) and pixel electrodes (not shown) are provided in the regions defined by the data lines 17 and the gate lines 16.

Although not shown in FIG. 1, color filters for each of the pixels are separated by a black matrix. Further, a common electrode, which is a counter electrode of the pixel electrode formed on the array substrate 10, is formed on the color filter substrate 5.

A certain cell gap is maintained between the color filter substrate 10 and the array substrate 5 by spacers (not shown), and the color filter substrate 10 and the array substrate 5 are attached by a seal line 50 formed along an outer edge of the pixel part 35.

A certain cell gap is maintained between the color filter substrate 10 and the array substrate 5 by spacers (not shown), and the color filter substrate 10 and the array substrate 5 are attached by a seal line 50 formed along an outer edge of the pixel part 35.

The process for fabricating a liquid crystal display panel can be divided into an array process for forming a driving element on a lower array substrate, a color filter process for forming color filters on an upper color filter substrate, and a cell process for forming a unit liquid crystal display panel by attaching the array substrate and the color filter substrate. This process will be described in detail with reference to FIG. 2.

A plurality of gate lines and a plurality of data lines are vertically and horizontally formed to define pixel regions on the array substrate in the array process, and TFTs, which are the driving elements, are formed in the pixel regions and connected with the gate lines and data lines (S101). Then, pixel electrodes are formed in each of the pixel regions of the array substrate so as to be connected to the TFTs through the array process. The pixel electrodes are used to drive the liquid crystal layer when a signal is applied through the TFTs.

Red, green and blue color filters for implementing colors and common electrodes are formed on the upper color filter substrate according to the color filter process (S104).

Subsequently, alignment films are coated on the array substrate and color filter substrate, and are rubbed to provide an alignment anchoring force or a surface fixing force (namely, a pretilt angle and an alignment direction) to the liquid crystal molecules of the liquid crystal layer positioned between the array substrate and the color filter substrate (S102 and S105). Thereafter, spacers for uniformly maintaining a cell gap are spread on the array substrate. Subsequently, a sealant is coated on an outer edge portion of the color filter substrate, and then the array substrate and the color filter substrate are attached by applying pressure thereto (S103, S106, and S107).

The array substrate and the color filter substrate are formed as large-scale mother substrates. In other words, a plurality of panel regions are formed on a large-scale mother substrate, and the TFTs, which are the driving elements, and the color filter layers are formed on individual panel regions. To fabricate the individual liquid crystal display panels, the mother substrate is processed (S108) so as to cut the mother substrate into the individual liquid crystal display panels. Thereafter, liquid crystal is injected into each of the processed liquid crystal display panels through a liquid crystal injection opening, and the liquid crystal injection opening is encapsulated to form the liquid crystal layer. Then, each liquid crystal display panel is inspected to complete fabrication of liquid crystal display panels (S109 and S110).

The vacuum injection method uses a liquid crystal injection opening of a unit liquid crystal display panel separated from a large-scale mother substrate. The liquid crystal injection opening is put in a container filled with a liquid crystal in a chamber in which a certain vacuum is set. Then, liquid crystal is injected into the liquid crystal display panel according to a pressure difference between an inner side and an outer side of the liquid crystal display panel by varying a degree of the vacuum in the chamber. After the liquid crystal is filled in the liquid crystal display panel, the liquid crystal injection opening is sealed to form the liquid crystal layer of the liquid crystal display panel. Accordingly, where the liquid crystal layer is formed on the liquid crystal display panel through the vacuum injection method, one portion of each seal line must be opened to function as the liquid crystal injection opening.

The vacuum injection method as described above has the following problems.

First, it takes a long time to fill the liquid crystal into the liquid crystal display panel. In general, the attached liquid crystal display panel with an area of several hundreds $cm^2$ has a gap of a few micrometers (μm). Thus, even with the vacuum injection method, which uses pressure difference, an injecting amount of the liquid crystal by unit time is quite small. For instance, when fabricating a liquid crystal display panel of about 15 inches, it takes 8 hours to fill the liquid crystal display panel with liquid crystal. Therefore, because it takes such a long time to fabricate the liquid crystal display panel, productivity is decreased. In addition, as the liquid crystal display panel increases in size, the time required for filling liquid crystal correspondingly increases and deficiencies in filling the liquid crystal may occur. Therefore, the vacuum injection method can hardly cope with a large-scale liquid crystal display panel.

Second, with the vacuum injection method, too much liquid crystal is consumed. In general, the actual injected quantity of liquid crystal in the vacuum injection method is very small compared to the quantity of liquid crystal filled in the container. When liquid crystal is exposed in the air or to a specific gas, it reacts with the gas and degrades. Thus, even if liquid crystal in a container is filled into a plurality of liquid crystal display panels, a large quantity of liquid crystal remaining after the filling has to be discarded, thereby increasing the overall unit price of the liquid crystal display and decreasing price competitiveness.

SUMMARY OF THE INVENTION

A method of fabricating a liquid crystal display panel according to the present invention comprises the steps of providing an array substrate having a pixel part and a color filter substrate; performing an array process in which thin film transistors are formed on the array substrate and a plurality of signal wires for transmitting signals to the thin film transistors are formed; performing a color filter process for forming color filters on the color filter substrate; and attaching the array substrate and the color filter substrate by dropping liquid crystal on to the array substrate or the color filter substrate and forming a seal line along an outer edge of the pixel part, wherein holes are formed within the signal wires passing through the seal line so as to have a different width at an inner side and an outer side of the liquid crystal display panel with respect to a predetermined region of the seal line.

A liquid crystal display panel according to the present invention comprises an array substrate having a pixel part and a color filter substrate; a seal line formed along an outer edge of the pixel part to attach the array substrate and the color filter substrate together; a plurality of signal wires for transmitting signals to the pixel part; and holes formed within the signal wires passing through the seal line and filled with a sealant comprising the seal line, wherein the holes are designed to have a different width at an inner side and an outer side of the liquid crystal display panel with respect to a predetermined region of the seal line.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 10 is a table showing a result of simulation of wiring resistance when the wiring structures according to the first and second embodiments of the present invention are applied.

DETAILED DESCRIPTION OF THE INVENTION

Hereinafter, a preferred embodiment of a liquid crystal display panel and a method of fabricating the same according to the present invention will be described in detail with reference to the accompanying drawings.

Figure 1:
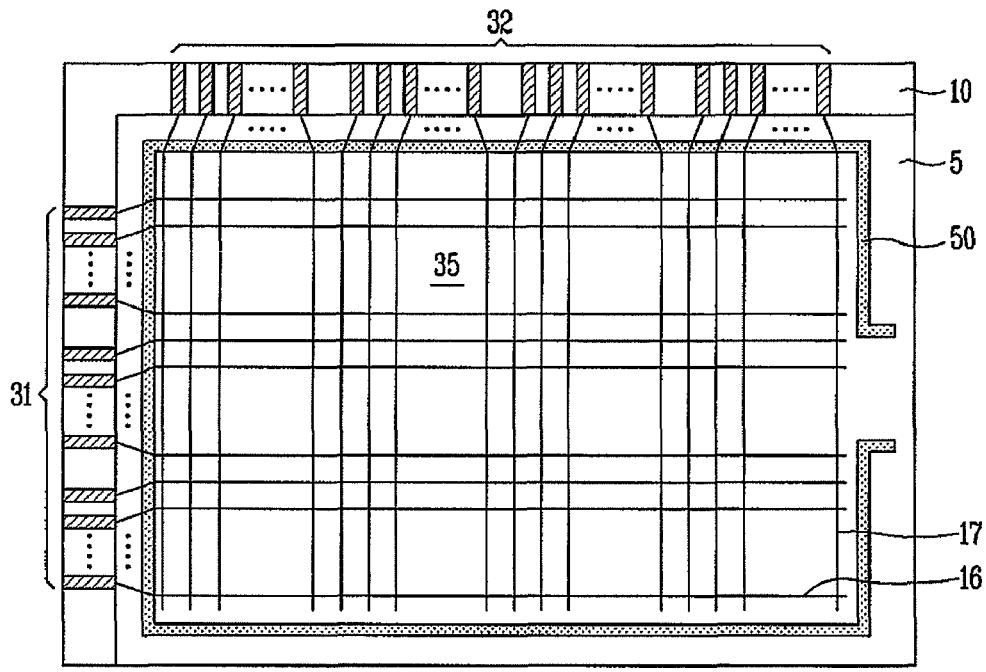
FIG. 1 is an illustrative view schematically showing a structure of a liquid crystal display panel according to the related art.
Figure 2:
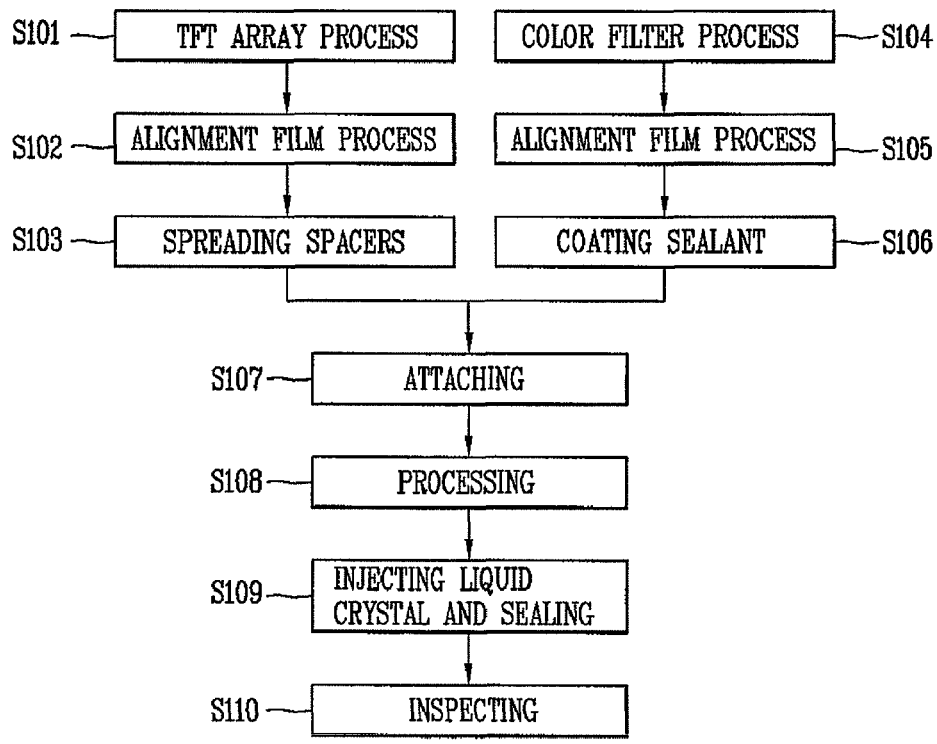
FIG. 2 is a flow chart sequentially showing a method of fabricating a liquid crystal display panel according to the related art.
Figure 3:
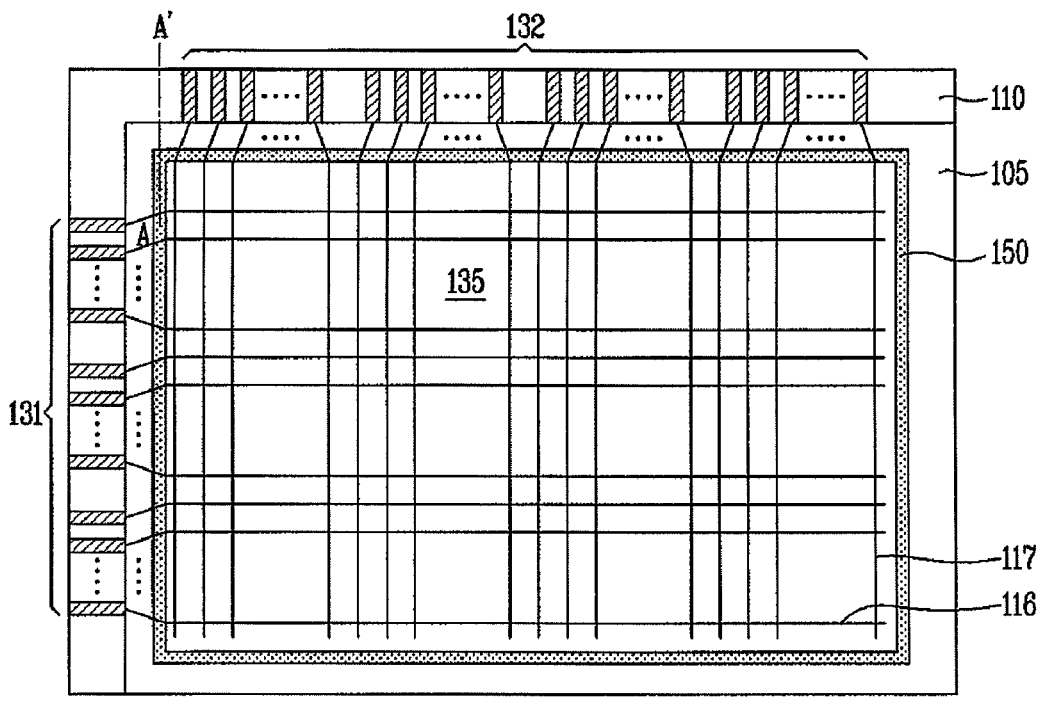
FIG. 3 is an illustrative view schematically showing a structure of a liquid crystal display panel according to the present invention.

FIG. 3 is an illustrative view schematically showing a structure of a liquid crystal display panel according to the present invention, wherein a liquid crystal layer is formed by a dropping method.

As shown in FIG. 3, the liquid crystal display panel includes a pixel part 135 having pixels arranged in a matrix for displaying an image, a gate pad part 131 electrically connected with the gate lines 116 of the pixel part 135, and a data pad part 132 electrically connected with the data lines 117 of the pixel part 135.

The gate pad part 131 and the data pad part 132 are formed at an edge portion of the array substrate 110, which is not overlapped by a color filter substrate 105. The gate pad part 131 supplies a scan signal from the gate driving unit (not shown) to the gate lines 116 of the pixel part 135, and the data pad part 132 supplies image information from the data driving unit (not shown) to the data lines 117 of the pixel part 135.

The data lines 117 to which image information is applied and the gate lines 116 to which a scan signal is applied are arranged to cross each other on the array substrate 110. A thin film transistor (not shown) and pixel electrodes (not shown) are provided in the regions defined by the data lines 117 and the gate lines 116.

Although not shown in FIG. 3, color filters for each of the pixels are separated by a black matrix. Further, a common electrode, which is a counter electrode of the pixel electrode formed on the array substrate 110, is formed on the color filter substrate 105.

With a certain cell gap maintained by spacers (not shown), the color filter substrate 105 and the array substrate 110 are attached by forming a seal line 150 on the color filter substrate 105 with a sealant and dropping liquid crystal (not shown) onto the array substrate 110.

The method of forming the spacers include a method in which ball spacers, such as glass beads or plastic beads, are dispersed at random. However, as liquid crystal display panels have grown in size in recent years, it has becomes more difficult to maintain a precise and uniform cell-gap due to clumping of the ball spacers. Such clumping results in poor picture quality.

Therefore, for a large liquid crystal display panel, no ball spacers are used. Instead, column spacers or patterned spacers are used that are directly patterned onto either the array substrate or the color filter substrate.

According to the dropping method, after liquid crystal is dropped and dispensed on a large-scale first mother substrate where a plurality of array substrates are disposed, or on a pixel part of a second mother substrate where a plurality of color filter substrates are disposed, the first and second mother substrates are attached by applying a certain pressure thereto, thereby making the liquid crystal uniformly distributed to the entire pixel part and thus form a liquid crystal layer.

Thus, where the liquid crystal layer is formed in the liquid crystal display panel through the dropping method, the seal line must be formed as a closed pattern surrounding the outer edge of the pixel part in order to prevent a leakage of liquid crystal to outside of the pixel part.

The dropping method allows dropping of liquid crystal within a relatively short time compared with the vacuum injection method and can quickly form the liquid crystal even when the liquid crystal display panel is large.

In addition, since the only required amount of liquid crystal is dropped on the substrate, such an increase in the unit cost of the liquid crystal display panel due to discarding of the high-priced liquid crystal as in the vacuum injection method can be prevented, and thus, the price competitiveness of the product can be enhanced.

The liquid crystal display panel to which the dropping method has been applied requires a process for separating the unit liquid crystal display panels from the large-scale mother substrate. A process for fabricating such a liquid crystal display panel will be described in detail with reference to the accompanying drawings.

Figure 4:
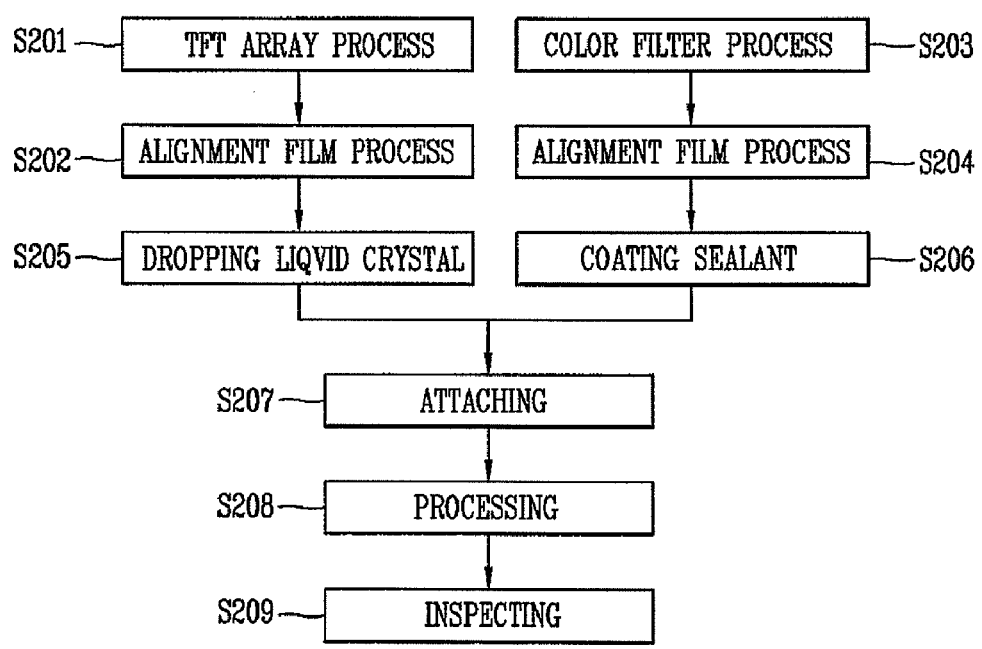
FIG. 4 is a flow chart sequentially showing a method of fabricating a liquid crystal display panel according to the present invention.

FIG. 4 is a flow chart sequentially showing a method of fabricating a liquid crystal display panel according to the present invention.

The process for fabricating the liquid crystal display panel can be divided into a driving element array process for forming a driving element on the lower array substrates, a color filter process for forming a color filter on the upper color filter substrate, and a cell process.

First, a plurality of gate lines and a plurality of data lines arranged to define pixel regions on the lower array substrate are formed, and a TFT, which is a driving element, is formed to be connected with the gate lines and the data lines at each of the pixel regions through the array process. In addition, a pixel electrode, which is connected with the TFT and drives the liquid crystal layer as a signal is applied thereto through the TFT, is formed through the array process.

Red, green and blue color filters for implementing colors, and common electrodes, are formed on the upper color filter substrate according to the color filter process (S203).

The array substrate and the color filter substrate comprise large scale first and second mother substrates. In other words, a plurality of panel regions are formed on a single large-scale glass substrate, where the TFTs, the driving elements, and the color filter layers are formed on each panel region.

Subsequently, alignment films are coated over the entire surfaces of the array substrate and color filter substrate, and are alignment-processed to provide an alignment anchoring force or a surface fixing force (namely, a pretilt angle and an alignment direction) to the liquid crystal molecules of the liquid crystal layer positioned between the array substrate and the color filter substrate (S202 and S204).

The alignment processing method can be a photo alignment method or a rubbing method using a roller. After the processing is finished, the first and second mother substrates are inspected as to whether or not the alignment films are defective by using an alignment film inspecting unit.

The liquid crystal panel uses the electro-optical effect of liquid crystal molecules. The electro-optical effect of liquid crystal molecules is determined by anisotropy of the liquid crystal material itself and a state of an arrangement of the liquid crystal molecules, and thus the controlling of the arrangement of the liquid crystal molecules influences the stability of the display quality of the liquid crystal panel.

To effectively align the liquid crystal molecules, the process of forming the alignment film is very important to the picture quality of the liquid crystal panel.

Thereafter, spacers for uniformly maintaining a cell gap are spread on the array substrate. Subsequently, a sealant is coated on an outer edge portion of the color filter substrate, and then the array substrate and the color filter substrate are attached by applying pressure thereto (S205, S206, and S207).

Afterwards, when the liquid crystal layer is formed according to a dropping method, a predetermined seal line is formed by coating a sealant on the second mother substrate, which is the color filter substrate, after inspection of the alignment film is complete. At the same time, liquid crystal is dropped onto the first mother substrate, which is the array substrate.

According to the dropping method, after liquid crystal is dropped and dispensed on a large-scale first mother substrate where a plurality of array substrates are disposed or on a pixel part of a second mother substrate where a plurality of color filter substrates are disposed, the first and second mother substrates are attached by applying a certain pressure thereto, thereby making the liquid crystal uniformly distributed to the entire pixel part and thus form a liquid crystal layer.

Thus, in the case where the liquid crystal layer is formed in the liquid crystal display panel through the dropping method, the seal line must be formed as a closed pattern surrounding the outer edge of the pixel part in order to prevent a leakage of liquid crystal to outside of the pixel part.

As stated above, the dropping method allows dropping of liquid crystal within a relatively short time compared with the vacuum injection method and can quickly form the liquid crystal even when the liquid crystal display panel is large. In addition, since the only required amount of liquid crystal is dropped on the substrate, such an increase in the unit cost of the liquid crystal display panel due to discarding of the high-priced liquid crystal as in the vacuum injection method can be prevented, and thus, the price competitiveness of the product can be enhanced.

Through the process, the plurality of liquid crystal display panels with the liquid crystal layer formed thereon are formed on the first and second mother substrates. The first and second mother substrates are processed and cut to be separated into the plurality of liquid crystal display panels, which are then inspected to finish fabrication of the liquid crystal display panel (S208 and S209).

In the liquid crystal display panel fabricated using the liquid crystal dropping method, predetermined holes are formed within signal wires passing through the seal line and filled with the sealant, thereby increasing the attachment force of the liquid crystal display panel. This will be described in detail with reference to the accompanying drawings.

Figure 5A:
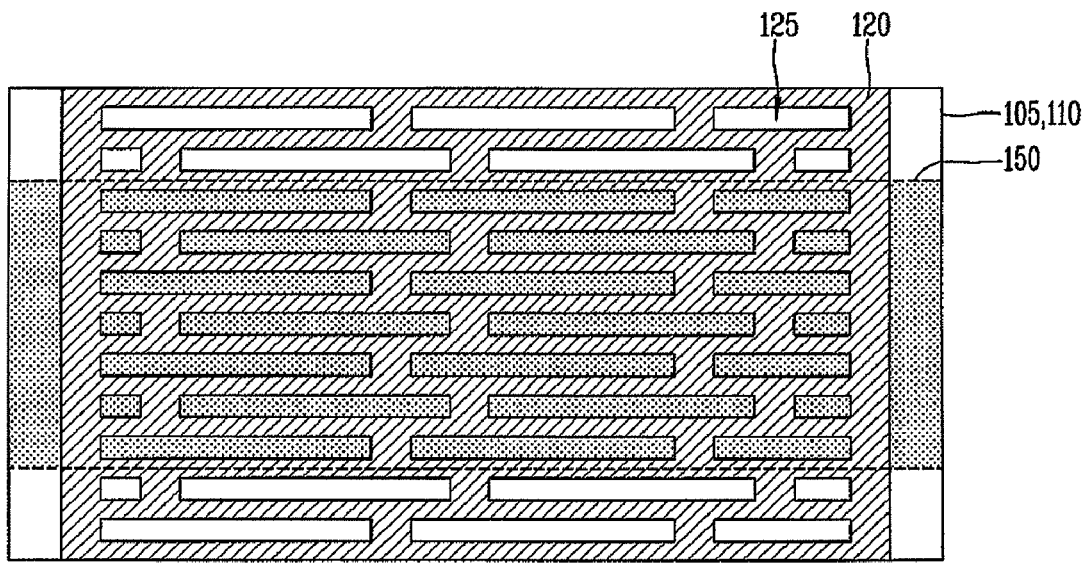
FIGS. 5A and 5B are views schematically showing a wiring structure according to a first embodiment of the present invention.
Figure 5B:
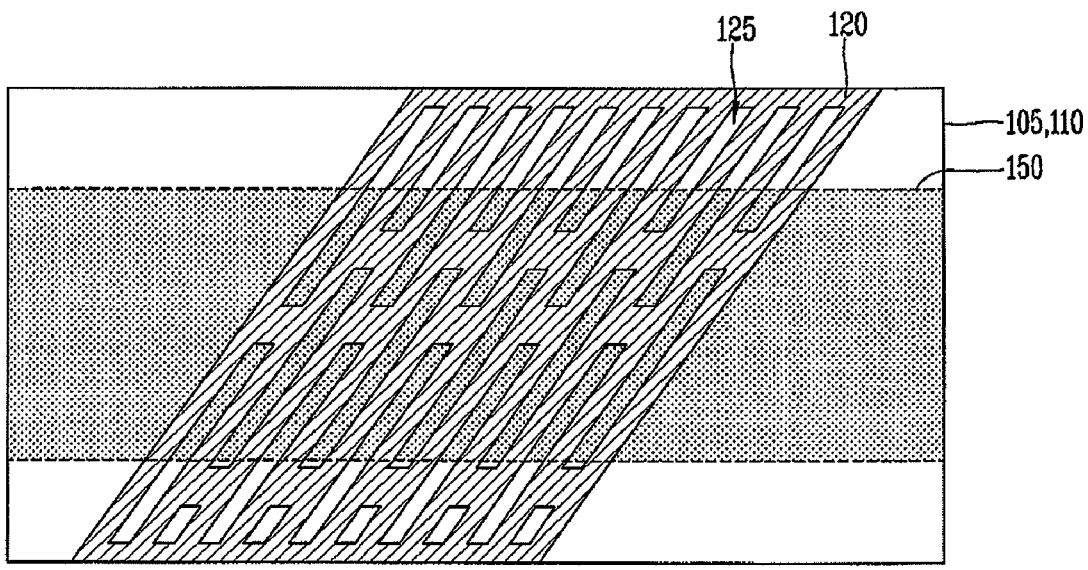

FIGS. 5A and 5B are views schematically showing a wiring structure according to a first embodiment of the present invention. FIG. 5A shows a case where signal wires pass through the seal line in a vertical direction, and FIG. 5B shows a case where the signal wires pass through the seal line in an oblique direction.

Figure 6:
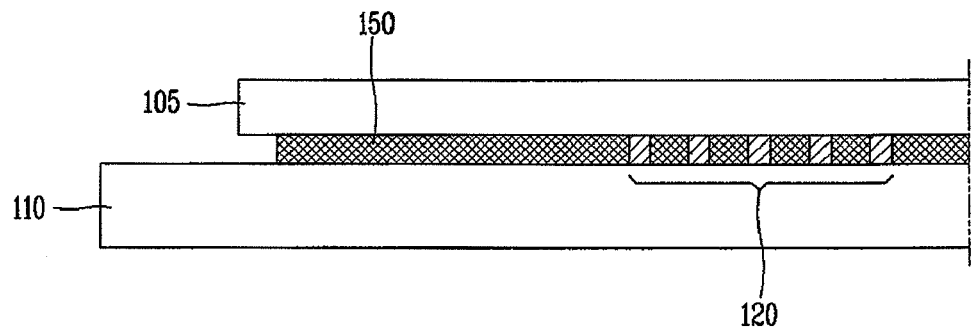
FIG. 6 is a cross sectional view taken along line A-A' of the structure of the liquid crystal display panel as shown in FIG. 3.

FIG. 6 is a cross sectional view taken along line A-A' of the structure of the liquid crystal display panel as shown in FIG. 3.

As shown therein, a color filter substrate 105 and an array substrate 110 according to the first embodiment of the present invention are attached by a seal line 150, with liquid crystal (not shown) dropped thereon, to constitute the liquid crystal display panel.

At this time, predetermined signal wires 120 pass through part of the seal line 150 in order to transmit a signal to a pixel part of the liquid crystal display panel from a driving unit. Predetermined holes 125 are formed within the wires 120 passing through the seal line 120 and filled with a sealant, thereby increasing the attachment force between the color filter substrate 105 and the array substrate 110.

In the first embodiment of the present invention, the holes are patterned to have a certain width and length, regardless of their position.

In this specification, for convenience of explanation, an edge of the liquid crystal display panel is disposed at an upper portion of the seal line 150 and the pixel part of the liquid crystal display panel is disposed at a lower portion of the seal line 150. Liquid crystal is dropped in a pattern form onto the lower portion of the seal line 150, i.e., into the pixel part of the liquid crystal display panel, and undergoes attachment and hardening of the seal line 150, thereby forming a predetermined liquid crystal layer in the pixel part.

In addition, the width and length of the holes 125 indicate the width and length of the holes 125 in longitudinal and transverse directions, respectively, with reference to the illustrated drawings.

As described above, in the liquid crystal display panel according to the first embodiment of the present invention, holes are formed within the wires passing through the seal line to thus increase the attachment force of the liquid crystal display panel as the attachment area between the color filter substrate and the array substrate is increased. However, the resistance of the signal wires increase in proportion to the area occupied by the holes.

That is, if the area of the holes of the wires is increased, the wiring resistance increases, thus deteriorating picture quality, and if the area of the holes of the wires is decreased, the wiring resistance decreases, but an afterimage defect caused by blurring and contamination of the seal line occurs.

Figure 7:
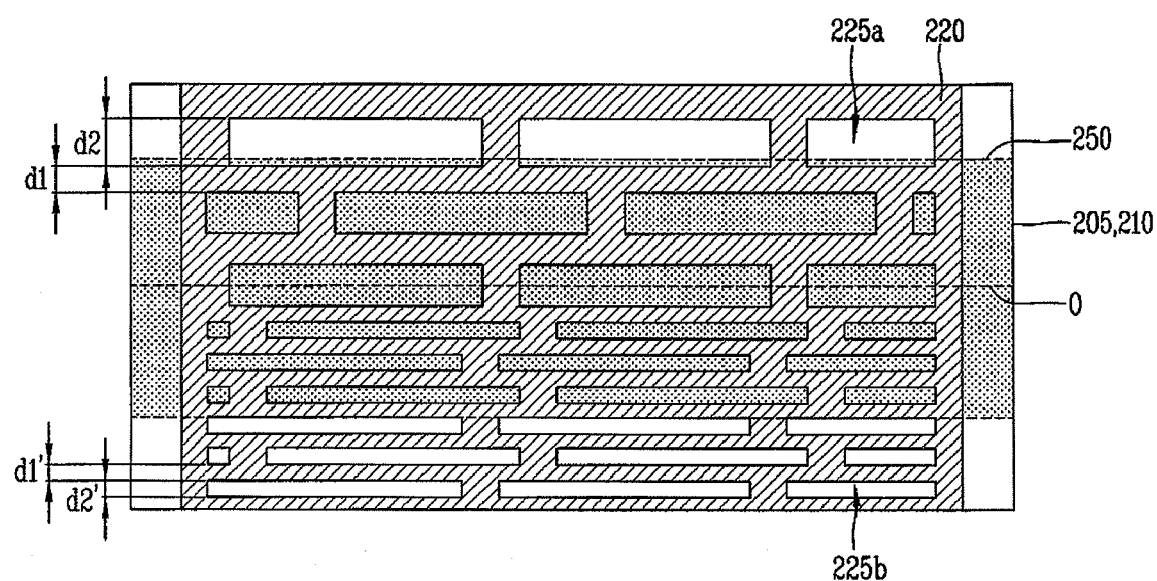
FIG. 7 is a view schematically showing a wiring structure according to a second embodiment of the present invention.

FIG. 7 is a view schematically showing a wiring structure according to a second embodiment of the present invention.

As shown therein, a color filter substrate 205 and an array substrate 210 according to the second embodiment of the present invention are attached by a seal line 250, with liquid crystal (not shown) dropped thereon, to constitute the liquid crystal display panel.

At this time, predetermined signal wires 220 pass through part of the seal line 250 in order to transmit a signal to a pixel part of the liquid crystal display panel from a driving unit. Predetermined holes 225a and 225b are formed within the wires 220 passing through the seal line 250 and filled with a sealant, thereby increasing the attachment force between the color filter substrate 205 and the array substrate 210.

In the second embodiment of the present invention, the width and length of the holes 225a and 225b are designed differently at an inner side and an outer side of the liquid crystal display panel with respect to a predetermined region of the seal line. Thus, the resistance of the wires 220 is reduced, and the hardening of the seal line is easily performed, thereby improving the aforementioned defects.

That is to say, in the second embodiment of the present invention, the widths of the holes 225a and 225b and the wires 220 are designed differently at an inner side and an outer side of the liquid crystal display panel with respect to a predetermined region of the seal line 250. The line widths of the first holes 225a and the wires 220 are made relatively large at the outer side of the liquid crystal display panel, and the line width of the wires 220 is made as small as possible and the width of the second holes 225b is made large at an edge portion of the seal line 250 in the liquid crystal display panel. Thus, the area occupied by the holes 225a and 225b (hereinafter, referred to as a hole opening rate) can be designed to be over 65%.

For example, the line widths d1 and d2 of the wires 220 and the first holes 225a may be 60μm and 30μm, respectively, at the outer side of the liquid crystal display panel with respect to the center (O) of the seal line 250, and the line widths d1' and d2' of the second holes 225b and the wires 220 may be 10 μm at the inner side of the liquid crystal display panel. For reference, in this case, the length of both of the first holes 225a and the second holes 225b may be 300 μm. However, the present invention is not limited to a case where the line widths of the holes 225a and 225b and the wires 220 are determined with respect to the center (O) of the seal line 250. In addition, in order to maintain a uniform cell gap, the line widths of the holes 225a and 225b and the wires 220 may be made smaller in any one of the inward and outward directions of the liquid crystal display panel.

FIG. 10 is a table showing a result of simulation of wiring resistance when the wiring structures according to the first and second embodiments of the present invention are applied.

As shown therein, in the liquid crystal display panel according to the first embodiment of the present invention, the holes and the wires have a certain width regardless of their position. In this case, it can be seen that the simulated wiring resistance is 2.98 kΩ and the hole opening rate is 46%.

Moreover, as in the liquid crystal display panel according to the second embodiment of the present invention where the widths of the holes and the wires are designed differently at an outer side and inner side of the liquid crystal display panel with respect to a specific region of the seal line, it can be seen that the simulated wiring resistance is 1.9kΩ, which is an improvement by 36.2% compared to the first embodiment, and the hole opening rate is 62%, which is an improvement by 34.8% compared to the first embodiment.

Figure 8:
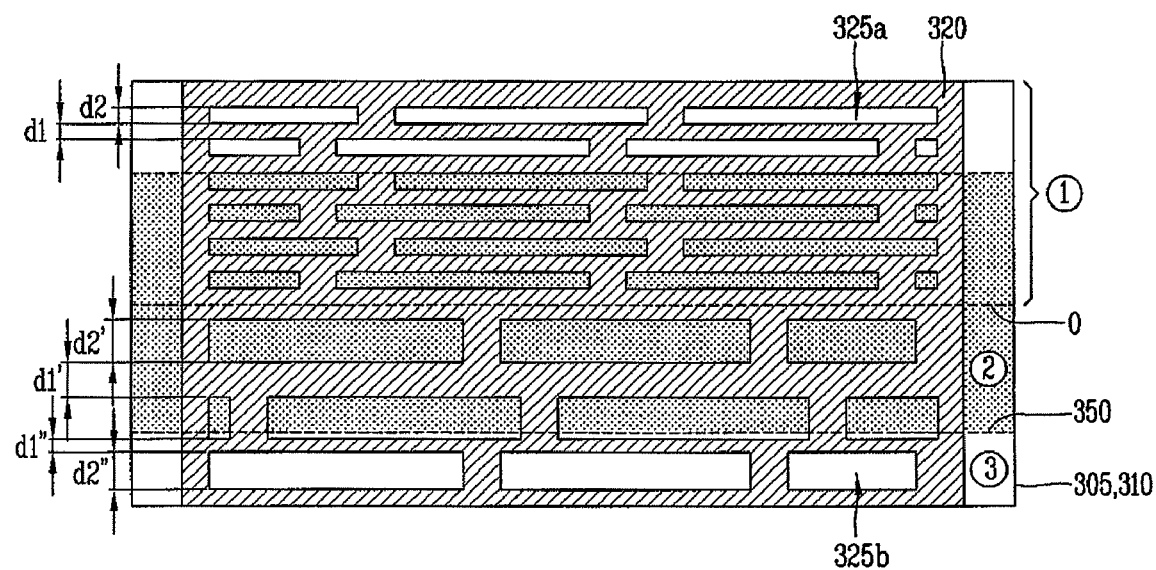
FIG. 8 is a view schematically showing a wiring structure according to a third embodiment of the present invention.

FIG. 8 is a view schematically showing a wiring structure according to a third embodiment of the present invention. This wiring structure comprises the same components as the wiring structure according to the second embodiment except that an opposite structure is applied at an outer side and inner side of the liquid crystal display panel.

As shown therein, a color filter substrate 305 and an array substrate 310 according to the third embodiment of the present invention are attached by a seal line 350, with liquid crystal (not shown) dropped thereon, to constitute the liquid crystal display panel.

At this time, predetermined signal wires 320 pass through part of the seal line 350 in order to transmit a signal to a pixel part of the liquid crystal display panel from a driving unit. Predetermined holes 325a and 325b are formed within the wires 320 passing through the seal line 350 and filled with a sealant, thereby increasing the attachment force between the color filter substrate 305 and the array substrate 310.

In the third embodiment of the present invention, the width and length of the holes 325a and 325b are designed differently at an inner side and an outer side of the liquid crystal display panel with respect to a predetermined region of the seal line in the same manner as in the second embodiment. Thus, the resistance of the wires 320 is reduced, and the hardening of the seal line is easily performed, thereby improving the aforementioned defects.

That is to say, in the third embodiment of the present invention, the widths of the holes 325a and 325b and the wires 320 are designed differently with respect to a predetermined region of the seal line 350, i.e., a first region (①), second region (②), and third region (③). The line widths d1 and d2 of the first holes 325a and the wires 320 are made relatively small in the first region (①) at the outer side of the liquid crystal display panel with respect to the center (O) of the seal line 350, and the second holes 325b may have a line width d2' of two times the line width d2 of the first holes 325a, i.e., line width d2' of over 30μm in the second region (②) and third region (③) within the liquid crystal display panel. At this time, the line width d1" of the wires 320 may be designed to be small in the third region (③), which is an edge portion of the seal line 350, like in the first region (①).

For reference, reference numeral d1' denotes the line width of the wires 320 in the second region (②), which is about two times the line width d1 of the wires 320 in the first region (①), and reference numeral d2" denotes a line width of the second holes 325b in the third region (③), which is identical to the line width d2' of the second holes 325b in the second region (②).

Figure 9:
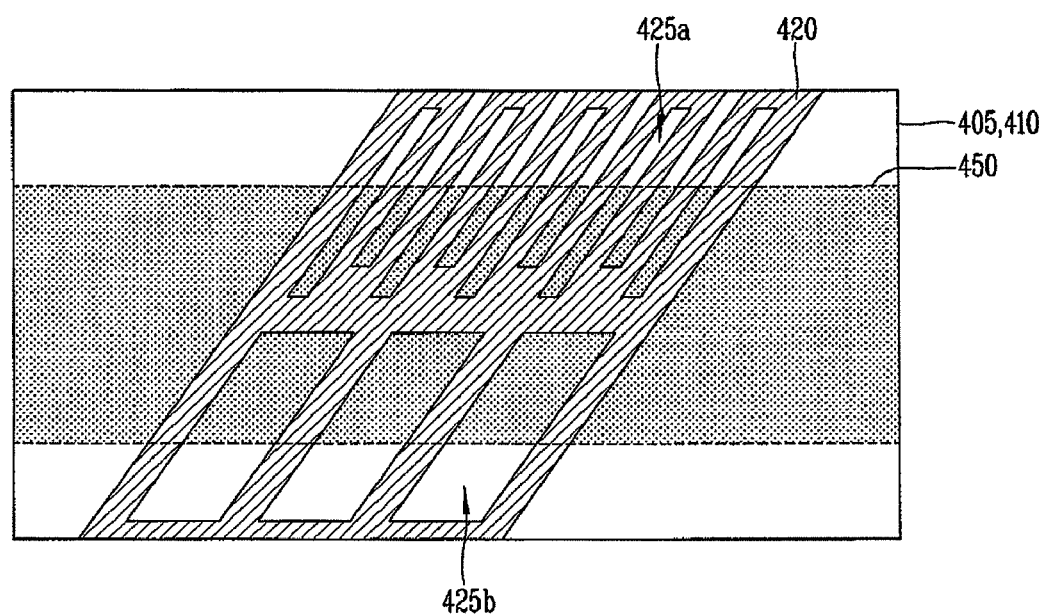
FIG. 9 is a view schematically showing a wiring structure according to a fourth embodiment of the present invention.

FIG. 9 is a view schematically showing a wiring structure according to a fourth embodiment of the present invention. This wiring structure comprises the same components as the wiring structures according to the second and third embodiments except that signal wires pass through a seal line in an oblique direction.

As shown therein, a color filter substrate 405 and an array substrate 410 according to the fourth embodiment of the present invention are attached by a seal line 450, with liquid crystal (not shown) dropped thereon, to constitute the liquid crystal display panel.

At this time, predetermined signal wires 420 pass through part of the seal line 450 in an oblique direction in order to transmit a signal to a pixel part of the liquid crystal display panel from a driving unit. Predetermined holes 425a and 425b are formed within the wires 420 passing through the seal line 450 and filled with a sealant, thereby increasing the attachment force between the color filter substrate 405 and the array substrate 410.

In the fourth embodiment of the present invention, the width and length of the holes 425a and 425b are designed differently at an inner side and an outer side of the liquid crystal display panel with respect to a predetermined region of the seal line in the same manner as in the second and third embodiments. Thus, the resistance of the wires 420 is reduced, and the hardening of the seal line is easily performed, thereby improving the aforementioned defects.

In this case, as the signal wires 420 pass through the seal line in an oblique direction, it can be seen that the width and length of the holes 425a and 425b indicate the width and length of the holes 425a and 425b in transverse and oblique directions, respectively, with reference to the illustrated drawings.

While the foregoing description sets forth many specific details, these specific details should not be construed as limitations on the scope of the invention, but rather as examples of preferred embodiments thereof. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

What is claimed is:

1. A liquid crystal display panel, comprising:
    an array substrate having a pixel part and a color filter substrate;
    a seal line disposed along an outer edge of the pixel part to attach the array substrate and the color filter substrate together;
    a plurality of signal wires that transmits signals to the pixel part; and
    holes disposed within the signal wires passing through the seal line and filled with a sealant comprising the seal line,
    wherein the holes include first holes and second holes and are designed to have a different line width at an inner side and an outer side of the liquid crystal display panel with respect to a predetermined region of the seal line, and
    wherein the line width of the first holes and the line width of the wires between two first holes at an outer side of the liquid crystal display panel are larger than the line width of the second holes and the line width of the wires between two second holes at an edge portion of the seal line in the liquid crystal display panel.

2. The liquid crystal display panel of claim 1, wherein the signal wires pass through the seal line in a vertical direction.

3. The liquid crystal display panel of claim 1, wherein the signal wires pass through the seal line in an oblique direction.

4. The liquid crystal display panel of claim 1, wherein the line width of the first holes and the line width of the wires between two first holes are 30 μm and 60 μm, respectively, at the outer side of the liquid crystal display panel, and the line width of the second holes and the line width of the wires between two second holes are 10 μm at the inner side of the liquid crystal display panel.

5. A liquid crystal display panel, comprising:
    an array substrate having a pixel part and a color filter substrate;
    a seal line disposed along an outer edge of the pixel part to attach the array substrate and the color filter substrate together;
    a plurality of signal wires that transmits signals to the pixel part; and
    holes disposed within the signal wires passing through the seal line and filled with a sealant comprising the seal line,
    wherein the holes include first holes and second holes and are designed to have a different line width at an inner side and an outer side of the liquid crystal display panel with respect to a predetermined region of the seal line, and wherein the line width of the first holes and the line width of the wires between two first holes are below 10 μm, at the outer side of the liquid crystal panel with respect to the center of the seal line, and the line width of the second holes is over 30 μm, at the inner side of the liquid crystal display panel.

6. The liquid crystal display panel of claim 5, wherein the line width of the wires between two second holes is below 10 μm, at an edge portion of the seal line disposed within the liquid crystal display panel.

* * * * *